United States Patent [19]

Pielartzik et al.

[11] Patent Number: 4,889,911

[45] Date of Patent: Dec. 26, 1989

[54] PROCESS FOR THE PRODUCTION OF FULLY AROMATIC, THERMOTROPIC POLYESTERS AND POLYESTER CARBONATES

[75] Inventors: Harald Pielartzik; Wolfgang Ebert; Rolf-Volker Meyer; Hans-Joachim Traenckner, all of Krefeld; Edgar Ostlinning, Duesseldorf, all of Fed. Rep. of Germany

[73] Assignee: Bayer Aktiengesellschaft, Leverkusen, Fed. Rep. of Germany

[21] Appl. No.: 231,071

[22] Filed: Aug. 11, 1988

[30] Foreign Application Priority Data

Aug. 20, 1987 [DE] Fed. Rep. of Germany ....... 3727730

[51] Int. Cl.$^4$ .............................................. C08G 63/38
[52] U.S. Cl. ..................................... 528/182; 528/199
[58] Field of Search ................................ 528/182, 199

[56] References Cited

U.S. PATENT DOCUMENTS 4,297,455 10/1981 Lindner et al. ..................... 528/199

Primary Examiner—Harold D. Anderson
Assistant Examiner—T. Mosley
Attorney, Agent, or Firm—Connolly and Hutz

[57] ABSTRACT

Thermotropic, fully aromatic polyesters and polyester carbonates are produced by esterification of optionally substituted p-hydroxybenzoic acids and aromatic dicarboxylic acids with diaryl carbonate at temperatures in the range from 100° to 220° C. and subsequent transesterification of the aryl ester obtained with diphenols and, optinally, more diaryl carbonate, accompanied by polycondensation, at temperatures in the range from 250° to 330° C., the esterification, the transesterification and the polycondensation being carried out in the presence of heterocyclic compounds containing 1 to 3 nitrogen atoms.

9 Claims, No Drawings

PROCESS FOR THE PRODUCTION OF FULLY AROMATIC, THERMOTROPIC POLYESTERS AND POLYESTER CARBONATES

This invention relates to a process for the production of thermotropic, fully aromatic polyesters and polyester carbonates.

Thermotropic or mesomorphic aromatic polyesters and polyester carbonates, which may be used for the production of molded articles, filaments, fibers and films, are described, for example, in DE-OS Nos. 33 25 704 and in 34 15 530. The meaning of "mesomorphic" or "thermotropic" is also explained therein, as is the standard method for investigating the liquid crystal state of polymer melts.

The thermotropic, fully aromatic polyesters based on optionally substituted p-hydroxybenzoic acid, isophthalic acid and, optionally, terephthalic acid, hydroquinone and/or 4,4'-dihydroxydiphenyl and 3,4'- and-/or 4,4'-dihydroxybenzophenone, which are claimed in the publications cited above, or the claimed mesomorphic aromatic polyester carbonates based on optionally substituted p-hydroxybenzoic acid, diphenol, carbonic acid and, optionally, aromatic dicarboxylic acid may be prepared by various methods, for example by esterification and transesterification of the reactive derivatives of the starting compounds and by subsequent polycondensation. In these processes, it is best to accelerate both the esterification and transesterification reactions and also the polycondensation reactions with catalysts. The catalysts normally used are the oxides, hydrides, hydroxides, halides, alcoholates, phenolates of the alkali metals or alkaline earth metals, the alkali or alkaline-earth metal salts of inorganic or organic acids, the complex salts or mixed salts of the alkaline-earth metals, the secondary group elements, such as vanadium, titanium, manganese, nickel, zinc, lanthanum, cerium, zirconium or of the elements of other groups of the periodic system, such as germanium, tin, lead and antimony, or even the alkali metals or alkaline-earth metals themselves. Typical catalysts are sodium, sodium hydroxide, lithium acetate, sodium acetate, potassium acetate, calcium acetate, magnesium acetate, cobalt acetate, zinc acetate, calcium benzoate, magnesium acetyl acetonate, zinc acetyl acetonate, titanium tetrabutylate titanium tetrapropylate, zirconium butylate, zirconium propylate, titanium tetraphenolate, sodium phenolate, germanium dioxide, antimony trioxide, dibutyltin diacetate and dibutyl dimethoxy tin.

One of the disadvantages of the processes mentioned above is that the metal-containing catalysts cannot be removed from the reaction mixture, resulting in unwanted postpolymerization during processing of the polymer compositions. Another disadvantage is that the products show inadequate thermal stability and undergo a considerable weight loss under processing conditions. In addition, the decarboxylation of p-hydroxybenzoic acid can occur in the state-of-the-art processes through the high reaction temperatures prevailing in the initial phase (Indian J. Chem. 10, 1011–1013, 1972). At the same time, the diaryl carbonate used can undergo Kolbe-Schmitt rearrangements and irregular decomposition at excessively high reaction temperatures (A. Davis, J. Chem. Soc. (B) 1968, 40, H. Schnell, Chemistry and Physics of Polycarbonates, Interscience London 1964).

Another disadvantage of the conventional processes is that products having high contents (>70 mol-%) of condensable p-hydroxybenzoic acid are inhomogeneously or heavily discolored.

In DE-OS No. 21 64 473, it is pointed out in the discussion of the prior art that the use of tertiary amines as catalysts in the production of polyesters from p-acetoxybenzoic acid methyl ester in accordance with U.S. Ser. No. 3,039,994 is attended by disadvantages because long reaction times are necessary and strongly colored polymers are formed.

DE-AS No. 12 80 240 describes the use of tautomerizable, 5-membered aromatic N-heterocycles containing two or more heteroatoms, optionally together with oxides of metals of the IVth, Vth and VIth main group and secondary group of the periodic system, as catalysts for the reaction of aromatic dicarboxylic acids with 1,2-dioxacycloalkan-2-ones to monomeric bis-hydroxyalkyl esters of the acids used. It is emphasized that the tautomerizable 5-membered aromatic N-heterocycles show considerably better catalytic activity than the known catalysts in the production of monomeric bis-hydroxyalkyl esters.

A process for the production of thermotropic, fully aromatic polyesters and polycarbonates by esterification of optionally substituted p-hydroxybenzoic acids and aromatic dicarboxylic acids with diaryl carbonate at temperatures in the range from 100° to 240° C. and subsequent esterification of the aryl esters obtained with diphenols and, optionally, more diaryl carbonate, accompanied by polycondensation, at temperatures in the range from 250° to 350° C. has now been found and is characterized in that the esterification, the transesterification and the polycondensation are carried out in the presence of heterocyclic compounds containing 1 to 3 nitrogen atoms.

The process according to the invention is preferably carried out as a one-pot process, i.e. the esterification, the transesterification and the polycondensation reaction are carried out in one and the same reaction vessel without isolation of the intermediate stages.

The esterification of optionally substituted p-hydroxybenzoic acids and the esterification of aromatic dicarboxylic acids with diaryl carbonate is preferably carried out at temperatures in the range from 130° to 220° C. The esterification (derivatization) of the carboxyl groups of the aromatic carboxylic acids used by reaction with diaryl carbonate takes place with elimination of carbon dioxide and phenol to form the corresponding aryl ester.

The esterification is started at relatively low temperatures (approximately 100° to 160° C.), the temperature gradually being increased to around 180° to 220° C. as the evolution of carbon dioxide abates.

After the evolution of carbon dioxide has stopped, the reaction temperature is increased to 250° to 330° C. and preferably to 270° to 320° C., the polycondensation taking place with transesterification of the aryl ester with the diphenols and, optionally, more diaryl carbonate to form high molecular weight polyester or polyester carbonates. The polycondensation and transesterification reaction is also started at relatively low temperatures (approximately 250° to 270° C.), the reaction temperature gradually being increased to 300° to 330° C. as the elimination of phenol abates.

To facilitate the elimination of phenol during the transesterification and polycondensation reaction, a light vacuum of approximately 800 to 300 mbar and preferably of 700 to 400 mbar may be applied at a temperature of only 250° C. To achieve the required degree of polycondensation, the temperature is increased, as already mentioned, as the reaction velocity (elimination of phenol) abates, the pressure in the reactor being continuously reduced from around 200 mbar to around 0.1 mbar and preferably from 100 mbar to 0.1 mbar at the same time.

The phenol obtained during the transesterification or polycondensation step of the process according to the invention accumulates in particularly pure form and, accordingly, may be returned to other process circuits, i.e. to the production of diphenyl carbonate, without any need for special purification.

Suitable heterocyclic compounds containing 1 to 3 nitrogen atoms, which are used in accordance with the invention to catalyze the esterification, transesterification and polycondensation reactions, include imidazole, 4,5-diphenyl-1H-imidazole, 1,10-phenanthroline, 2,2'-bipyridyl, 1H-benzimidazole, 1,2-dimethyl-1H-benzimidazole, 2-methyl-1H-imidazole, 1-methyl-1H-imidazole, 1H-pyrazole, 4-dimethylaminopyridine, 4-pyrrolidinopyridine, 1,8-bis-(dimethylamino)naphthalene, 1,8-diazabicyclo-5,4,0-undec-7-ene, 1,8-diazabicyclo-4,3,0-non-5-ene, 1,4-diazabicyclo-2,2,2-octane and/or 1,4,5,6-tetrahydro-1,2-dimethyl pyrimidine. It is preferred to use the above-mentioned imidazoles, imidazole itself being particularly preferred.

According to the invention, the catalyst is used in a concentration of from about 0.01 to 5% by weight and preferably in a concentration of 0.1 to 2.5% by weight, based on the carboxylic acids used.

The p-hydroxybenzoic acids used in the process according to the invention may be those types which are optionally nucleus-substituted by $C_1$-$C_4$ alkyl (preferably methyl, ethyl), $C_1$-$C_4$ alkoxy (preferably methoxy, ethoxy, propoxy), $C_6$-$C_{12}$ aryl (preferably phenyl, naphthyl, biphenyl), $C_6$-$C_{10}$ alkyl aryl (preferably phenyl, tolyl, naphthyl) and/or bihalogen (preferably chlorine, bromine). Examples of p-hydroxybenzoic acids such as these are 4-hydroxy-2-methyl benzoic acid, 4-hydroxy-3-methyl benzoic acid, 2-ethyl-4-hydroxybenzoic acid, 3-ethyl-4-hydroxybenzoic acid, 2- or 3-chloro-4-hydroxybenzoic acid, 4-hydroxy-3-phenyl benzoic acid, 4-hydroxy-3-phenyl benzoic acid or p-hydroxybenzoic acid, preferably p-hydroxybenzoic acid.

Aromatic dicarboxylic acids suitable for use in the process according to the invention are those which contain from 8 to 24 and preferably from 8 to 14 carbon atoms and which may be substituted by $C_1$-$C_4$ alkyl radicals, such as methyl, ethyl, $C_1$-$C_4$ alkoxy radicals, such as methoxy, ethoxy, propoxy, and/or bihalogen atoms, such as chlorine and bromine.

Examples of suitable aromatic dicarboxylic acids are naphthalene-1,5-dicarboxylic acid, diphenyl-2,2'-dicarboxylic acid, diphenyl-4,4'-dicarboxylic acid, diphenyl methane-4,4'-dicarboxylic acid, diphenyl ether-4,4'-dicarboxylic acid, diphenyl sulfone-4,4'-dicarboxylic acid, terephthalic acid, isophthalic acid and naphthalene-2,6-dicarboxylic acid, preferably terephthalic acid, isophthalic acid and naphthalene-2,6-dicarboxylic acid.

Suitable derivatives for the production of the aryl esters from the corresponding carboxylic acids and for the incorporation of carbonate groups are diaryl carbonates, such as diphenyl carbonates, ditolyl carbonate, phenyl tolyl carbonate and dinaphthyl carbonate. Diphenyl carbonate is preferably used.

Diphenols suitable for use in the process according to the invention are compounds corresponding to the following formula

HO—Z—OH       (I)

in which Z is a difunctional, mononuclear or polynuclear aromatic radical containing from 6 to 30 carbon atoms, the structure of Z being such that the two OH groups are each directly attached to a carbon atom of an aromatic system, such as (1) hydroquinone, methyl hydroquinone, 1,5-dihydroxynaphthalene, 2,6-dihydroxynaphthalene, 4,4'-dihydroxydiphenyl, which do not contribute to significant angling of the polycondensate chain, and (2) compounds which contribute to significant angling of the polycondensate chain, such as resorcinol, 1,6-dihydroxynaphthalene, 2,5-dihydroxynaphthalene, 2,7-dihydroxynaphthalene and bisphenols corresponding to the following formula

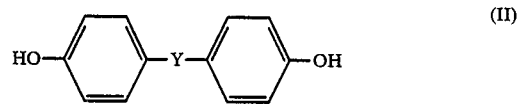
(II)

in which Y is an alkylene or alkylidene radical containing 1 to 7 carbon atoms, a cycloalkylene or cycloalkylidene radical containing 5 to 12 carbon atoms,

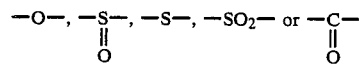

and a nucleus-alkylated and nucleus-halogenated derivatives thereof, for example bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfoxides, bis-(hydroxyphenyl)-sulfones and 4,4'-bis-(hydroxyphenyl)-diisopropylbenzenes.

Particularly suitable diphenols of formula (II) are bis-(4-hydroxyphenyl)-methane, 1,1-bis-(4-hydroxyphenyl)-ethane, bisphenol A, 1,1-bis-(-hydroxyphenyl)-cyclohexane, bis-(4-hydroxyphenyl)-sulfone, 4,4'-dihydroxydiphenyl ether and 4,4'-dihydroxydiphenyl sulfide.

It is advisable to select the diphenols in such a way that at most 30 mol-%, based on the total quantity of diphenol residues, are diphenol residues belonging to group (2). A high proportion of diphenol residues of group (2) is acceptable particularly when it is compensated by additional linear residues, such as terephthalic acid residues.

In the process according to the invention, the reaction components used, i.e. the optionally substituted p-hydroxybenzoic acid (a), the diphenol (b), the dicarboxylic acid (c) and the diaryl carbonate (d), are mixed together in the desired ratio. The quantity of diaryl carbonate required is calculated as follows:
(a) optionally substituted p-hydroxybenzoic acid
(b) diphenol
(c) dicarboxylic acid
(d) diaryl carbonate $$[d] = [a] + 2\,[c] + ([b] - [c])$$

In the process according to the invention, the diaryl carbonate is used as reagent on the one hand for forming the corresponding carboxylic acid aryl esters and, on the other hand, for forming the carbonate groups where polyester carbonates are to be produced.

Accordingly, the equivalent ratio of diaryl carbonate to carboxylic acid derivative is at least 1:1 and preferably 1.01 to 1.1:1.

As can be seen from the term ([b]−[c]), the content of co-condensed carbonate groups is determined by the equivalent ratio of dicarboxylic acid to diphenol.

Molecular weight regulation is occasionally required and may be obtained by means of monofunctional compounds which terminate the polycondensation reactions.

Monofunctional compounds in this context are monofunctional carboxylic acids, preferably aromatic carboxylic acids, such as benzoic acid, chlorobenzoic acids, methyl benzoic acids, naphthalene carboxylic acids or diphenyl carboxylic acids, monofunctional aromatic hydroxy compounds, such as phenol, methylphenols, ethylphenols, p-nonylphenol, p-chlorophenol, 4-(1,1-dimethylpropyl)-phenol, 4-(1,1,3,3-tetramethylbutyl)-phenol, dodecylphenols, dimethylphenol, hydroxynaphthalenes, and monofunctional thiophenols, such as thiophenol, 4-methylthiophenol. 4-Hydroxybiphenyl is preferably used.

The polyester carbonates according to the invention may be terminated by —H, —OH, —OC$_6$H$_5$ or by residues of chain terminators.

It is possible by the process according to the invention to produce thermotropic, fully aromatic polyesters and polyester carbonates based on (a) optionally substituted p-hydroxybenzoic acid,
(b) diphenol,
(c) aromatic dicarboxylic acid and, optionally,
(d) carbonic acid, the polyesters and polyester carbonates containing the co-condensed residue (a) in a concentration of 30 to 95 mol-%, preferably 65 to 90 mol-% and more preferably 70 to 85 mol-%, the co-condensed residue (b) in a concentration of 0 to 70, preferably 0 to 40 and more preferably 0 to 30 mol-%, the co-condensed residue (c) in a concentration of 0 to 70, preferably 0 to 30 and more preferably 0 to 30 mol-% and the co-condensed residue (d) in a concentration of 5 to 70, preferably 10 to 35 and more preferably 15 to 30 mol-%, based in each case on the sum of the co-condensed residues a to d. The molar ratio of the co-condensed residues is as follows: a+b = 1; b = c+d;

$$0 \leq \frac{d}{c + d} \leq 1$$

The thermotropic polyesters and polyester carbonates produced by the process according to the invention generally have an inherent viscosity of at least 1.0 dl/g (as measured on a solution of 5 mg polymer/ml pentafluorophenol at 60° C.). If the products are insoluble in the solvents mentioned, it is assumed that they have the minimum viscosity indicated.

To increase their molecular weights, the products—preferably in granulate form—may be subjected to solid-phase post-condensation in an inert gas atmosphere or in vacuo at temperatures in the range from 150° to 300° C.

By virtue of their relatively low melt viscosity, the thermotropic polyesters and polyester carbonates produced by the process according to the invention may advantageously be processed from the melt to form injection-molded articles, fibers and films, the shear forces generated producing a molecular orientation which is influenced to a high degree by the intensity of the shear forces. In addition, they show pronounced structural viscosity, i.e. the melt viscosity decreases considerably with increasing shear forces. Another important feature of the thermotropic polyesters and polyester carbonates produced by the process according to the invention is their high heat distortion temperature, HDT-A, of 170° to 250° C.

Molded articles of high tensile strength, extreme toughness and high dimensional stability can be produced from the polyesters and polyester carbonates according to the invention. Since the polyesters and polyester carbonates show high resistance to chemicals and high flame resistance, they are particularly suitable for the production of electrotechnical articles, such as insulators, printed circuits, plugs, fittings, parts of chemical engineering plant, such as for example pipes, vessel linings, rotors, friction bearings, seals parts for furbishing the interior or aircraft parts of medical-technical equipment, components of air conditioning installations and valve components.

The process according to the invention avoids decomposition reactions which lead to discoloration of the polymeric products. In addition, the phenol eliminated is obtained in a purity which enables it to be re-used in other process circuits, such as the production of diphenyl carbonate. In addition, it is no longer necessary in the process according to the invention to remove the catalysts from the reaction mixture in order to avoid unwanted secondary reactions.

The use of the catalysts according to the invention greatly accelerates the formation of the phenyl esters at low temperature, so that decomposition reactions involving starting products, for example decarboxylation of p-hydroxybenzoic acid, are avoided.

In addition, the use of the catalysts according to the invention accelerates the polycondensation of p-hydroxybenzoic acid phenyl ester to such an extent that hardly any p-hydroxybenzoic acid phenyl ester is distilled off at the relatively high reaction temperatures. It is thus possible to produce polyesters and polyester carbonates containing a particularly high proportion of p-hydroxybenzoic acid. In addition, there is no need for co-catalysts to be used in the process according to the invention. The high activity and selectivity of the catalysts used in accordance with the invention makes the process for the production of thermotropic, fully aromatic polyesters and polyester carbonates particularly economical.

In addition, it was particularly surprising to the expert to find that it is possible by the process according to the invention to produce polyesters and polyester carbonates of high molecular weight and high thermal stability which have high contents of co-condensed p-hydroxybenzoic acid, because, in view of the particular catalytic activity of the N-heterocycles used, it had been expected from DE-AS No. 32 80 240 that the products thus produced would show considerable differences in regard to stability and color.

The following Examples are intended to illustrate the process according to the invention without limiting it in any way.

EXAMPLE 1

322.9 g 4-hydroxybenzoic acid, 66 g hydroquinone, 11.2 g 4,4'-dihydroxydiphenyl, 39.8 g isophthalic acid, 707.2 g diphenyl carbonate and 1.45 g imidazole were weighed into a reaction vessel equipped with a stirrer, column and distillation bridge. The evolution of $CO_2$ began at an internal temperature of 160° C. The internal temperature was increased to 180° C. over a period of 15 minutes, kept constant for 60 minutes, increased to 220° C. and kept constant until the evolution of $CO_2$ was over. The reaction mixture was heated to 250° C. and the pressure in the reactor was reduced in steps to 30 mbar over a period of 1.5 h.

After 1 h, the distillation rate had fallen to such an extent that the internal temperature could be increased to 275° C. and then to 300° C. When the elimination of phenol was largely at an end, the pressure in the reaction vessel was reduced to 0.2 mbar. The reaction was terminated after 1 h under these condensation conditions. The product obtained was light in color and showed a pronounced fibrous structure. It was injection molded at a melt temperature of T=330° C. and at a mold temperature of 70° C. The inherent viscosity $n_{inh}$ was 1.97 dl/g.

EXAMPLE 2

344.4 g 4-hydroxybenzoic acid, 70.4 g hydroquinone, 11.9 g 4,4'-dihydroxydiphenyl, 698.5 g diphenyl carbonate and 1.41 g imidazole were weighed into a reaction vessel equipped with a stirrer, column and distillation bridge. The evolution of $CO_2$ began at an internal temperature of 160° C. The internal temperature was increased to 180° C. over a period of 15 minutes, kept constant for 60 minutes, increased to 220° C. and kept constant until the evolution of $CO_2$ was over. The reaction mixture was heated to 250° C. and the pressure in the reactor was reduced in steps to 30 mbar over a period of 1.5 h.

After 1 h, the distillation rate had fallen to such an extent that the internal temperature could be increased to 275° C. and then to 300° C. When the elimination of phenol was largely at a end, the pressure in the reaction vessel was reduced to 0.2 mbar. The reaction was terminated after 1 h under these condensation conditions. The product obtained was light in color and showed a pronounced fibrous structure. It was injection-molded at a melt temperature of T=350° C. and at a mold temperature of 70° C.

EXAMPLE 3

355.5 g 4-hydroxybenzoic acid, 72.7 g hydroquinone, 12.3 9 4,4'-dihydroxydiphenyl, 20.4 g terephthalic acid, 93.2 g isophthalic acid, 879.7 g diphenyl carbonate and 2.40 g 4,5-diphenyl-1H-imidazole were weighed into a reaction vessel equipped with a stirrer, column and distillation bridge. The internal temperature was increased to 180° C. over a period of 15 minutes, kept constant for 60 minutes, increased to 220° C. and kept constant until the evolution of $CO_2$ was over. The reaction mixture was heated to 250° C. and the pressure in the reactor was reduced in steps to 30 mbar over a period of 1.5 h.

After 1 h, the distillation rate had fallen to such an extent that the internal temperature could be increased to 275° C. and then to 300° C. When the elimination of phenol was largely at an end, the pressure in the reaction vessel was reduced to 0.2 mbar. The reaction was terminated after 1 h under these condensation conditions. The product obtained was light in color and showed a pronounced fibrous structure. It was injection-molded at a melt temperature of T=340° C. and at a mold temperature of 70° C.

EXAMPLE 4

341.9 g 4-hydroxybenzoic acid, 72.7 g hydroquinone, 20.7 g dihydroxydipheny1,721,1 g diphenyl carbonate and 1.46 g imidazole were weighed into a reaction vessel equipped with a stirrer, column and distillation bridge. The evolution of $CO_2$ began at an internal temperature of 160° C. The internal temperature was increased to 180° C. over a period of 15 minutes, kept constant for 60 minutes, increased to 220° C. and kept constant until the evolution of $CO_2$ was over. The reaction mixture was heated to 250° C. and the pressure in the reactor was reduced in steps to 30 mbar over a period of 1.5 h.

After 1 h, the distillation rate had fallen to such an extent that the internal temperature could be increased to 275° C. and then to 300° C. When the elimination of phenol was largely at an end, the pressure in the reaction vessel was reduced to 0.2 mbar. The reaction was terminated after 1 h under these condensation conditions. The product obtained was light in color and showed a pronounced fibrous structure. It was injection-molded at a melt temperature of T=330° C. and at a mold temperature of 70° C. The inherent viscosity $n_{inh}$ measured 2.63 dl/g.

EXAMPLE 5

341.8 g 4-hydroxybenzoic acid, 72.7 g hydroquinone, 30.7 g 4,4'-dihydroxydiphenyl, 27.4 g terephthalic acid, 109.7 g isophthalic acid, 897.8 g diphenyl carbonate and 1.95 g 2-methyl imidazole were weighed into a reaction vessel equipped with a stirrer, column and distillation bridge. The evolution of $CO_2$ began at an internal temperature of 160° C. The internal temperature was increased to 180° C. over a period of 15 minutes, kept constant for 60 minutes, increased to 220° C. and kept constant until the evolution of $CO_2$ was over. The reaction mixture was heated to 250° C. and the pressure in the reactor was reduced in steps to 30 mbar over a period of 1.5 h.

After 1 h, the distillation rate had fallen to such an extent that the internal temperature could be increased to 275° C. and then to 300° C. When the elimination of phenol was largely at an end, the pressure in the reaction vessel was reduced to 0.2 mbar. The reaction was terminated after 1 h under these condensation conditions. The product obtained was light in color and showed a pronounced fibrous structure. It was injection-molded at a melt temperature of T=340° C. and at a mold temperature of 70° C.

EXAMPLE 6

331.5 g 4-hydroxybenzoic acid, 49.5 g hydroquinone, 27.9 g 4,4'-dihydroxdiphenyl, 49.8 g isophthalic acid, 786.6 g diphenyl carbonate and 1.56 g imidazole were weighed into a reaction vessel equipped with a stirrer, column and distillation bridge. The evolution of $CO_2$ began at an internal temperature of 160° C. The internal temperature was increased to 180° C. over a period of 15 minutes, kept constant for 60 minutes, increased to 220° C. and kept constant until the evolution of $CO_2$ was over. The reaction mixture was heated to 250° C. and the pressure in the reactor was reduced in steps to 30 mbar over a period of 1.5 h.

After 1 h, the distillation rate had fallen to such an extent that the internal temperature could be increased to 275° C. and then to 300° C. When the elimination of phenol was largely at an end, the pressure in the reaction vessel was reduced to 0.2 mbar. The reaction was terminated after 1 h under these condensation conditions. The product obtained was light in color and showed a pronounced fibrous structure it was injection-molded at a melt temperature of T=340° C. and at a mold temperature of 70° C.

The mechanical properties of the LC polymers of Examples 1 to 8 are shown in the following Table.

| Example | Impact/notched impact strength | (kJ/m$^2$) | Ultimate strength MPa | E-modulus in tension MPa | Flexural strength MPa | E-modulus in flexure MPa | Heat distortion temperature HDT-A (°C.) |
|---|---|---|---|---|---|---|---|
| 1 | 50 | 30 | 200 | 18 900 | 140 | 7050 | 190 |
| 2 | 78 | 33 | 163 | 15 400 | 150 | 6570 | 230 |
| 3 | 75 | 45 | 158 | 19 500 | 165 | 8300 | 205 |
| 4 | 87 | 40 | 178 | 12 870 | 103 | 4730 | 180 |
| 5 | 45 | 35 | 210 | 18 300 | 173 | 7850 | 215 |
| 6 | 67 | 48 | 185 | 16 500 | 128 | 7310 | 204 |
| 7 | 49 | 33 | 149 | 15 360 | 131 | 5770 | 220 |
| 8 | 65 | 40 | 140 | 14 700 | 105 | 6800 | 190 | tion vessel was reduced to 0.2 mbar. The reaction was terminated after 1 h under these condensation conditions. The product obtained was light in color and showed a pronounced fibrous structure. It was injection-molded at a melt temperature of T=340° C. and at a mold temperature of 70° C.

EXAMPLE 7

341.8 g 4-hydroxybenzoic acid, 72.7 g hydroquinone, 30.7 g 4,4'-dihydroxydiphenyl, 27.4 g terephthalic acid, 757.1 g diphenyl carbonate and 1.54 g imidazole were weighed into a reaction vessel equipped with a stirrer, column and distillation bridge. The evolution of $CO_2$ began at an internal temperature of 160° C. The internal temperature was increased to 180° C. over a period of 15 minutes, kept constant for 60 minutes, increased to 220° C. and ept constant until the evolution of $CO_2$ was over. The reaction mixture was heated to 250° C. and the pressure in the reactor was reduced in steps to 30 mbar over a period of 1.5 h.

After 1 h, the distillation rate had fallen to such an extent that the internal temperature could be increased to 275° C. and then to 300° C. When the elimination of phenol was largely at an end, the pressure in the reaction vessel was reduced to 0.2 mbar. The reaction was terminated after 1 h under these condensation conditions. The product obtained was light in color and showed a pronounced fibrous structure. It was injection-molded at a melt temperature of T=330° C. and at a mold temperature of 70° C.

EXAMPLE 8

209.8 g 4-hydroxybenzoic acid, 31.4 g hydroquinone, 17.7 g 4,4'-dihydroxydiphenyl, 15.8 g terephthalic acid, 435.5 g diphenyl carbonate and 1.65 g dimethyl aminopyridine were weighed into a reaction vessel equipped with a stirrer, column and distillation bridge. The evolution of $CO_2$ began at an internal temperature of 160° C. The internal temperature was increased to 180° C. over a period of 15 minutes, kept constant for 60 minutes, increased to 220° C. and kept constant until the evolution of $CO_2$ was over. The reaction mixture was heated to 250° C. and the pressure in the reactor was reduced in steps to 30 mbar over a period of 1.5 h.

After 1 h, the distillation rate had fallen to such an extent that the internal temperature could be increased to 275° C. and then to 300° C. When the elimination of phenol was largely at an end, the pressure in the reaction vessel was reduced to 0.2 mbar. The reaction was terminated after 1 h under these condensation conditions. The product obtained was light in color and showed a pronounced fibrous structure it was injection-molded at a melt temperature of T=340° C. and at a mold temperature of 70° C.

Impact strength $a_n$ and notched impact strength $a_k$ are tested on standard small test bars in accordance with DIN 53 453 (ISO/R 179) using 10 test specimens for each test. Test temperature: 23° C.

Flexural strength was determined on standard small test bars in accordance with DIN No. 53 452 (ISO/R 178). E-modulus in flexure was determined in accordance with DIN No. 53 457.

The heat distortion temperature was measured in accordance with DIN No. 53 461 (ISO 75). Flow behavior in the melt was evaluated by measurement of the melt viscosity. Unless otherwise stated, the nozzle had a length-to-thickness (L/D) ratio of 30:1.

We claim:

1. A process for the production of thermotropic, fully aromatic polyesters and polyesters carbonates by (i) esterification of unsubstituted or substituted p-hydroxybenzoic acids and aromatic dicarboxylic acids with diaryl carbonate at temperatures of 100° to 220° C. and (ii) subsequent transesterification of the aryl esters from (i) with diphenols accompanied by polycondensation, at temperatures in the range from 250° to 330° C. wherein esterification, the transesterification and the polycondensation reactions are carried out in the presence of 0.01 to 5% by weight of at least one heterocyclic compound containing 1 to 3 nitrogen atoms, based on the amount of carboxylic acid reactant 2. A process as claimed in claim 1 wherein the esterification, transesterification and polycondensation reactions are carried out without isolation of the intermediate products in a one-pot process.

3. A process as claimed in claim 1 wherein the heterocyclic compound containing 1 to 3 nitrogen atoms is in a quantity of 0.1 2.5% by weight, based on the carboxylic acids.

4. A process as claimed in claim 1 wherein the heterocyclic compound is at least one member selected from the group consisting of imidazole, 4,5-diphenyl-1H-imidazole, 1,10-phenanthroline, 2,2'-bipyridyl, 1H-benzimidazole, 1,2-dimethyl-1H benzimidazole, 2-methyl-1H-imidazole, 1-methyl-1H-imidazole, 1H-pyrazole, 4-dimethyl aminopyridine, 4-pyrrolidinopyridine, 1,8-diazabicyclo-5, 4,0-undec-7-ene, 1,8-diazabicyclo-4,3,0- non-5-ene, 1,4-diazabi- cyclo-2,2,2-octane and 1,4,5,6-tetrahydro-1,2-dimethyl pyrimidine.

5. A process as claimed in claim 1 wherein imidazole is the heterocyclic compound.

6. A process as claimed in claim 1 wherein the p-hydroxybenzoic acid is ring-substituted by $C_1$–$C_4$ alkyl, $C_1$–$C_4$ alkoxy, $C_6$–$C_{12}$ aryl, $C_6$–$C_{10}$ alkylaryl or halogen.

7. A process as claimed in claim 6 wherein the p-hydroxybenzine acid is 4-hydroxy-2-methyl benzoic acid, 4-hydroxy-3-methyl benzoic acid, 2-ethyl-4-hydroxybenzoic acid, 3-ethyl-4-hydroxybenzoic acid, 2- or 3-chloro-4-hydroxybenzoic acid, 4-hydroxy-3-phenyl benzoic acid or 4-hydroxy-3-phenyl benzoic acid.

8. A process as claimed in claim 1 wherein the p-hydroxybenzoic acid is unsubstituted p-hydroxybenzoic acid.

9. A process as claimed in claim 1 wherein the trans-esterification (ii) of the aryl esters is with diphenols and diaryl carbonate.

* * * * *